Feb. 2, 1960 — W. E. SULLIVAN — 2,923,284
VALVE SEAT INSERT
Filed Aug. 6, 1958
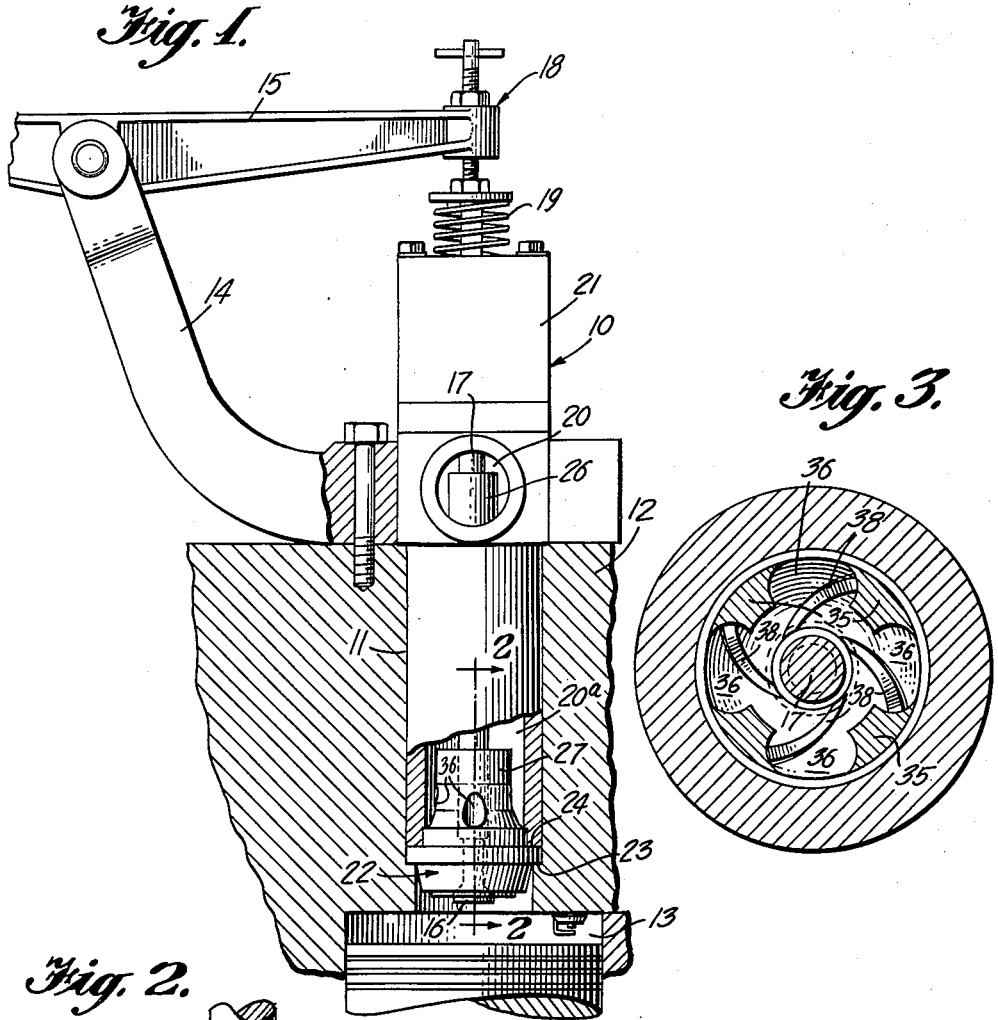
INVENTOR
W. E. Sullivan
BY Mason, Fenwick & Lawrence
ATTORNEYS United States Patent Office 2,923,284
Patented Feb. 2, 1960

2,923,284

VALVE SEAT INSERT

William E. Sullivan, Marshall, Tex., assignor to Wesco Valve Company, Inc., Marshall, Tex., a corporation of Texas Application August 6, 1958, Serial No. 753,453

5 Claims. (Cl. 123—188)

This invention relates to valve seats for internal combustion engines, such as heavy duty two-cycle industrial engines operated on natural gas, and more particularly to a fuel valve seat insert for such engines.

Heavy duty, two-cycle industrial type internal combustion engines using natural gas as a fuel are provided with a fuel valve having its head inside of the combustion chamber, the valve being opened by axial movement into the combustion chamber upon actuation by the rocker arm. Known fuel valve assemblies comprise a valve box through which the stem of the valve passes and which has an inlet port for the natural gas fuel. A valve seat is provided at the combustion chamber end of the valve box and a valve guide is provided for the stem of the valve at a point at the opposite end of the valve box. The valve seat is in the form of an insert having machined rabbeted edge seating on a cooperating machined ledge of the valve box. In practical use it is very difficult to set the seat and the valve guide in accurate alignment. If there is mis-alignment the face of the valve does not fit properly into the valve seat and this will result in a gas leakage and loss of engine efficiency. Even when the valve guide and valve seat are aligned accurately when assembled, it is practically impossible for this alignment to remain true after the engine has been run for an extended period of time, because of pounding of the valve against the seat, wear of component parts and uneven distortion of the different parts of the valve box assembly caused by high operating temperatures.

In a two-cycle natural gas fired engine, air for combustion enters the cylinder at the side of the combustion chamber at a point near the lower end of the stroke of the piston. Natural gas is admitted at the top of the combustion chamber. No provision is made in known engines of this type for effecting an efficient mixing of air and gas, and the efficiency of such engines is therefore lower than would be possible if the air and gas were mixed more efficiently.

Consequently, it is an object of the present invention to provide a fuel valve seat insert which does not require alignment with the valve guide in the valve box.

Another object of the present invention is to provide a fuel valve seat insert which will impart cyclonic energy to the gas entering the combustion chamber to cause it to thoroughly mix with the air in the combustion chamber to thereby increase the efficiency of the combustion.

Other objects and advantages of the present invention will become apparent to those skilled in the art from the following description when read in conjunction with the accompanying drawing wherein:

Figure 1 is a vertical side elevation of a fuel valve box of an internal combustion engine using natural gas as fuel, parts being broken away to show the valve seat insert of the present invention in place;

Figure 2 is a vertical sectional view through the valve box and fuel valve seat insert, taken on the line 2—2 of Figure 1; and Figure 3 is a horizontal cross-sectional view taken on the line 3—3 of Figure 2.

Adverting now to the drawing and more paritcularly to Figure 1, the numeral 10 denotes a fuel valve box, or cage, assembly for a two-cycle natural gas fired, internal combustion engine. The valve box 10 is mounted in a bore 11 of the cylinder head 12, the bore 11 being in communication with a cylinder 13 of the engine.

The valve box 10 is provided with a rocker arm bracket 14 having a rocker arm 15 pivotally mounted thereon. A valve 16 having a stem 17 extending axially of the valve box is connected to the rocker arm 15 as at 18. The valve is opened upon downward movement of the rocker arm against the bias of the valve spring 19 which returns the valve to closed position.

A port 20 places a conduit portion 20a of the valve box 10 in communication with the fuel supply manifold (not shown) and a stuffing box 21 prevents escape of gas from the valve box.

A valve seat insert 22 is mounted in the bore 11 between an annular ledge 23 provided at the inner end of the bore 11 adjacent the combustion chamber and the innermost end 24 of the valve box 10, as best seen in Figure 2. The valve seat insert has an annular rabbet 25 to receive the end 24 of the valve box. The flange portion 25a of the rabbet 25 seats on the ledge 23, the parts being machined or otherwise made gastight. A sleeve guide 26 for the valve stem 17 is mounted within the valve box 10.

An integral valve guide 27 is provided for the insert 22. The extremity of the valve guide 27 which extends innermost in the valve box 10 is of less external diameter than the valve box 10 and flares outwardly to the diameter of the valve box 10 at its juncture with the annular rabbet 25. A sleeve bearing 28 to receive the valve stem 17 is mounted in a cylindrical bore 29 of the valve guide 27. A seat portion 30 of the valve seat insert 22 has a fuel orifice 31 which is provided with a flared annular seat 32 to cooperate with the conical valve head 33 of valve 16 to valve the orifice 31. The seat portion 30 has an interior vortex chamber 34, said chamber having a conical wall 35 tapering inwardly from its jointure with the valve guide 27 to the orifice 31. A plurality of passageways 36 annularly spaced in the flared portion of the valve guide 27 place the vortex chamber 34 in communication with the conduit portion 20a of the valve box 10. The passageways 36 are slanted from the annular recess 37 between the reduced diameter of the valve guide portion 27 toward the orifice 31. A plurality of spirally disposed baffles 38 outstanding from the conical wall 35 of the vortex chamber 34 extend from the passageways 36 to the orifice 31 so that fuel entering the vortex chamber 34 through the passageways 36 will be given a cyclonic motion. This cyclonic motion will be continued when the fuel enters the combustion chamber and cause the gas to thoroughly mix with the air in the combustion chamber.

By providing a valve seat insert which as combined therewith a valve guide the seat for the valve is pre-set. The services of a skilled mechanic are not needed to align the seat of an insert with a valve guide mounted on a valve box. The seat and the guide of the present invention are pre-set when the insert is made and this setting remains true for the life of the insert. The guide and the seat are exposed to a much smaller differential in temperature that is the case of valve seat insert and a valve guide mounted in a valve box which extends through a water-cooled cylinder head.

The valve seat insert of the present invention does not require any change in the design of valve boxes now in use since it replaces without change to the valve box the valve seat insert in common use on gas engines such as the "Clark" and "Cooper-Bessemer."

Valve boxes which would otherwise have to be discarded because they would be considered worn out can now be restored to useful service by the valve seat insert of the present invention and the engine on which they are installed will have greater efficiency due to the true setting of the valve and seat and the cyclonic mixing of the air and gas.

While there has been disclosed in the foregoing description a practical embodiment of the fuel valve seat insert in accordance with the present invention, it will be understood by those skilled in the art that variations in the implementation of the concept of the invention are within the purview and scope of the invention.

What is claimed is:

1. A valve seat insert for the valve box of a cylinder of an internal combustion engine for valving gaseous fuel passing therethrough comprising, a closure body having means for attachment at the combustion chamber end of said valve box and having an orifice on which the fuel valve of the cylinder seats, a valve stem guide integrally mounted on said closure body and axially aligned with said orifice, a vortex chamber within said closure body having its outlet at said orifice, means for placing said vortex chamber in communication with the fuel supply for said cylinder, and means within said vortex chamber for creating a cyclonic effect in the gaseous fuel which passes through said vortex chamber.

2. A valve seat insert for the valve box of a cylinder of an internal combustion engine comprising, a closure body having means for attachment at the combustion chamber end of said valve box and having an orifice on which the fuel valve of the cylinder seats, a valve stem guide integrally mounted on said closure body and axially aligned with said orifice, a conical chamber having its apical end terminating in said orifice, said conical chamber having a plurality of openings spaced circumferentially about the wall of said conical chamber and spaced from said orifice, a plurality of spirally disposed outstanding baffles on said conical chamber wall between said openings in said conical chamber wall and said orifice, and means for placing said openings in said conical chamber wall in communication with the fuel supply of said engine.

3. A combination valve seat and vortex chamber for the fuel valve box of a combustion chamber of an internal combustion engine comprising, an integral closure body having means for attachment at the combustion chamber end of said valve box, a valve seat portion on said closure body at the combustion chamber end of said closure body, a valve stem guide portion on said closure body extending into said valve box and being of substantially less diameter than said valve box to provide a recess therebetween, said valve seat portion having a port opening into said combustion chamber and a seat for the fuel valve for said combustion chamber, said valve stem guide portion being spaced from said valve seat portion, a conical chamber intermediate said valve stem guide portion and said valve seat portion having its apical end terminating in said port, a plurality of circumferentially spaced passageways through said closure body, said passageways providing communication between said conical chamber and said recess formed between said valve guide portion of said closure body and said valve box.

4. In a fuel valve seat insert for use in the valve box between the main valve mechanism and the gas inlet opening of the cylinder head of an internal combustion engine to provide a seat for the head of the valve, the improvement comprising, in combination, a body portion for said insert, means for seating said body portion on the cylinder head at the gas inlet opening of said cylinder, means for seating said main valve mechanism on said body portion, said body portion having an orifice, an annular valve seat around said orifice to receive the valve head in valving relation, said valve head being movable away from said seat into said cylinder, said body portion having a passageway in communication with said orifice, said passageway being in communication with said fuel supply, and a valve guide integrally affixed to said body portion, whereby axial alignment of said valve head with said valve seat by grinding-in will insure said valve head being guided to accurately seat at said orifice.

5. In a fuel valve seat insert for use in the valve box between the main valve mechanism and the gas inlet opening of the cylinder head of an internal combustion engine to provide a seat for the head of the valve, the improvement comprising, in combination, a body portion for said insert, means for seating said body portion on the cylinder head at the gas inlet opening of said cylinder, means for seating said main valve mechanism on said body portion, said body portion having an orifice an annular valve seat around said orifice to receive the valve head in valving relation, said valve head being movable away from said seat into said cylinder, said body portion having a chamber in communication with said orifice, said chamber being in communication with said fuel supply, and a valve guide integral with said body portion, whereby axial alignment of said valve head with said valve seat by grinding-in will insure said valve head being guided to accurately seat at said orifice.

References Cited in the file of this patent

UNITED STATES PATENTS

| | | |
|---|---|---|
| 1,774,928 | Land | Sept. 2, 1930 |
| 2,667,155 | Paluch | Jan. 26, 1954 |
| 2,763,249 | Flynn | Sept. 18, 1956 |
| 2,827,032 | Wicknich | Mar. 18, 1958 |